Sept. 7, 1965  J. S. ALBUS  3,205,361
LIGHT SENSITIVE DIGITAL ASPECT SENSOR
Filed March 10, 1961  7 Sheets-Sheet 1

INVENTOR
JAMES S. ALBUS
BY
Richard J. Keegan
ATTORNEYS

Sept. 7, 1965  J. S. ALBUS  3,205,361
LIGHT SENSITIVE DIGITAL ASPECT SENSOR
Filed March 10, 1961  7 Sheets-Sheet 2

| | A | B | C | D |
|---|---|---|---|---|
| 1 | 0 | 0 | 0 | 1 |
| 2 | 0 | 0 | 1 | 1 |
| 3 | 0 | 0 | 1 | 0 |
| 4 | 0 | 1 | 1 | 0 |
| 5 | 0 | 1 | 1 | 1 |
| 6 | 0 | 1 | 0 | 1 |
| 7 | 0 | 1 | 0 | 0 |
| 8 | 1 | 1 | 0 | 0 |
| 9 | 1 | 1 | 0 | 1 |
| 10 | 1 | 1 | 1 | 1 |
| 11 | 1 | 1 | 1 | 0 |
| 12 | 1 | 0 | 1 | 0 |
| 13 | 1 | 0 | 1 | 1 |
| 14 | 1 | 0 | 0 | 1 |
| 15 | 1 | 0 | 0 | 0 |

INVENTOR

JAMES S. ALBUS

BY *Richard J. Keegan*

ATTORNEYS

Sept. 7, 1965    J. S. ALBUS    3,205,361
LIGHT SENSITIVE DIGITAL ASPECT SENSOR
Filed March 10, 1961    7 Sheets-Sheet 3

INVENTOR
JAMES S. ALBUS
BY
ATTORNEYS

Sept. 7, 1965 J. S. ALBUS 3,205,361
LIGHT SENSITIVE DIGITAL ASPECT SENSOR
Filed March 10, 1961 7 Sheets-Sheet 4

INVENTOR
JAMES S. ALBUS
BY
ATTORNEYS

Sept. 7, 1965  J. S. ALBUS  3,205,361
LIGHT SENSITIVE DIGITAL ASPECT SENSOR
Filed March 10, 1961  7 Sheets-Sheet 5

INVENTOR
JAMES S. ALBUS
BY
ATTORNEYS

Sept. 7, 1965   J. S. ALBUS   3,205,361
LIGHT SENSITIVE DIGITAL ASPECT SENSOR
Filed March 10, 1961   7 Sheets-Sheet 6

INVENTOR
JAMES S. ALBUS
BY
ATTORNEYS

Sept. 7, 1965  J. S. ALBUS  3,205,361
LIGHT SENSITIVE DIGITAL ASPECT SENSOR
Filed March 10, 1961  7 Sheets-Sheet 7

INVENTOR
JAMES S. ALBUS
BY
ATTORNEYS

United States Patent Office 3,205,361
Patented Sept. 7, 1965

3,205,361
LIGHT SENSITIVE DIGITAL ASPECT SENSOR
James S. Albus, Washington, D.C., assignor to the United States of America as represented by the Administrator of the National Aeronautics and Space Administration
Filed Mar. 10, 1961, Ser. No. 94,952
11 Claims. (Cl. 250—203)
(Granted under Title 35, U.S. Code (1952), sec. 266)

The invention described herein may be manufactured and used by or for the Government of the United States of America for governmental purposes without the payment of any royalties thereon or therefor.

The present invention relates to radiation sensing devices and more particularly to an improved light aspect sensing device which produces a direct binary digital signal corresponding to the direction of a light source relative to the sensor.

In the conduct of scientific experiments in outer space, it is frequently necessary to determine the direction of the sun or some other luminous body, either in connection with other experiments, or because that information is important in its own right. Previous solar or lunar light aspect sensors have included devices such as analogue sun followers which do not directly produce a binary digital output. Because of environmental limitations existing in space technology, for example, extremely long transmission ranges and extremely limited transmission power available in satellites and space probes, the transposition of the output of prior art devices into a transmissible signal has posed a considerable problem. Generally, the information signal produced had to be transformed into a binary digital form so that it could be fed directly into a pulse code modulation telemetering system or similar transmitting device. To accomplish this transposition required considerable associated circuit arrangements of varying complexities both in the payload itself and in the ground data reducing equipment. In some instances the greater power requirements necessary in the satellite, or other payload, and the complex circuitry with its attendant payload weight penalty forced experimenters to forgo the valuable information which would be available had the direction of the solor vector been readily ascertainable.

Briefly stated, the general purpose of the present invention includes the provision of a radiation sensing device which embraces all the advantages of similarly employed light or sun sensing means and possesses none of the aforedescribed disadvantages. Moreover, the present invention contemplates features and has advantages, particularly for spaced exploration work, which make it far superior to any of the known analogue or digital sensors previously employed for those purposes. To attain these advantages the instance invention may be mounted on an earth satellite or space probe so that it provides elevation and azimuth angles of the sun vector relative to the payload coordinate system. The field of view of one embodiment of the sensor may be arbitrarily selected to be fan shaped, 90 degrees long by approximately 4 degrees in width. This viewing fan is quantitized into fifteen equal sectors which may be represented by four binary bits of information. With this arrangement, as the payload carrying the sensor rotates, if the sun appears in one of these sectors, a binary number corresponding to that particular sector will appear at the sensor output. Alternate embodiments of the invention can employ any given field of view and can divide that field of view into $2_N-1$ parts when there are N binary bits. For example, the field of view can be divided into fifteen, or thirty-one, or sixty-three or more sectors or parts by using four, five, or six, or more, binary bits, respectively. This division is limited to $2_N-1$ because one of the possible combinations, that when all digits are zero, is not used. Some other embodiments of the invention, as will be appreciated as the description proceeds, may employ a wide angle field of view so that rotation of the payload carrying the sensor is not necessary for the sensor operation. Various other features will appear and become obvious to those skilled in the art as the invention is developed in the remaining portions of the specification.

Accordingly, one object of the present invention is the provision of an improved light sensing device which will provide a direct binary digital output indicative of the direction of a light source from the sensor.

Another object of the instant invention is to provide an improved digital solar aspect sensor for determining the direction of the solar vector relative to a satellite or a space probe.

A further object of the invention is the provision of an improved solar sensor which will provide a direct binary digital output suitable for ready transmission by a pulse code modulated telemetering system.

Still another object of the invention is to provide an extremely simple, lightweight solar aspect sensing device for use on a rotating satellite for determining the direction of a light emitting body relative to the satellite.

Yet another object of the invention is to provide a solar aspect sensor for use with a non-rotating satellite for determining the direction of the solar vector and indicating this direction by means of a readily transmissible binary signal.

A still further object of the invention is to provide an improved construction of a digital solar aspect sensor which can be made very compact, light in weight and reliable and especially suited for space vehicle use.

Still another object of the invention is to provide a wide angle sensing device which will detect and focus light rays approaching from wide angles to give a continuous binary digital indication of the direction of the light source from the sensor.

Still a further object is to provide a solar sensing device which will provide binary digital signals corresponding to the spherical or cartesian coordinates of a light source with respect to a known reference system on a space vehicle.

Various other objects and advantages will appear from the following description of several embodiments of the invention and the novel features will be particularly pointed out hereinafter in connection with the appended claims.

Figure 1:
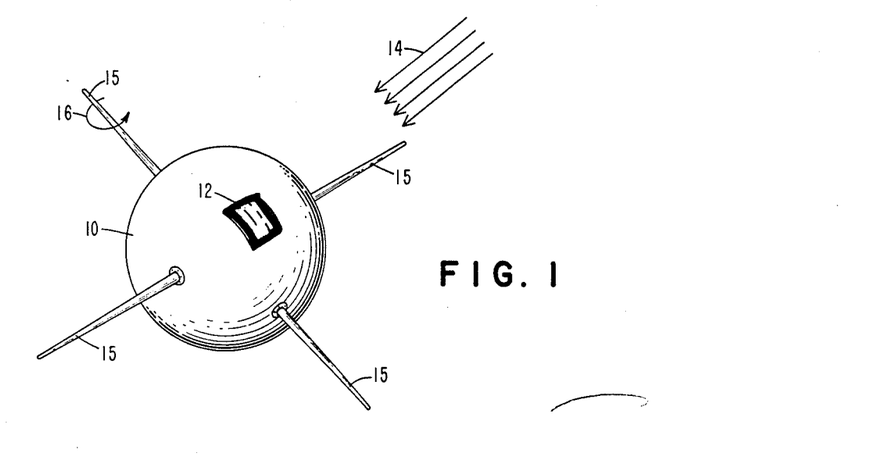
Referring to FIG. 1, there is illustrated one typical application of the invention, as applied to a rotating spherical satellite in orbit, showing how the sensor, due to the rotation of the satellite, will be swept across rays emanating from a light source, for example the sun.

Referring to FIG. 1, there is illustrated therein at 10, a typical rotating satellite of the general configuration of the Vanguard series, carrying four antennas 15 oriented to each other at 90°, and a solar aspect sensor 12 mounted on the satellite skin. As the satellite 10 rotates, in the direction indicated by the curved arrow 16, the sensor 12 will be swept through the sun's rays, shown at 14. As will become clear as the description proceeds, this action can produce a signal in the sensor corresponding to the location of the sun vector relative to the coordinate system of the satellite.

Figure 2:
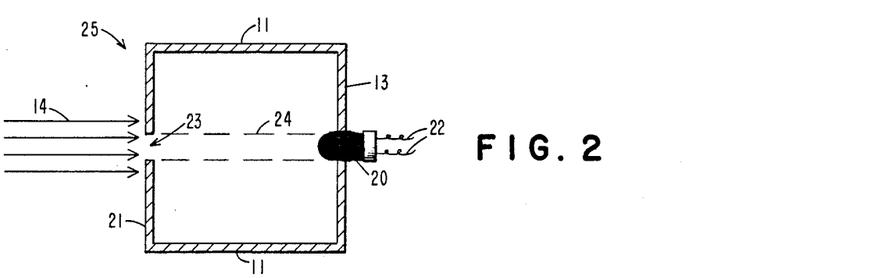
In FIG. 2, there is diagrammatically illustrated a simple embodiment of the invention showing how light rays can penetrate the mask of the sensor to illuminate a photosensitive detecting device positioned therein.

In FIG. 2, a simplified embodiment 25 is depicted of the sensor 12 shown in FIG. 1. A light mask 21 is provided with an aperture 23 through which light rays, here designated as sun rays 14 can pass. The back 13 of the sensor is connected by means of walls 11 to the light mask 21, and carries imbedded therein a photosensitive detector, here illustrated as a photo diode 20. Output leads 22 are connected to the photo-diode to make available a binary digital output of either "1" or "0," corresponding to the "on" or "off" condition of the photo-diode depending on whether or not the photo-diode is illuminated. In the figure, since the sun rays 14 are inpinging upon the sensor 25 from the direction indicated, light passing the mask will traverse a light corridor 24 to illuminate photo-diode 20 and the signal at output 22 will be a "1" indicating an "on" condition of the detecting device. It will be noted that an "on-off" device such as a photo-diode is essentially a binary device.

Figure 3:
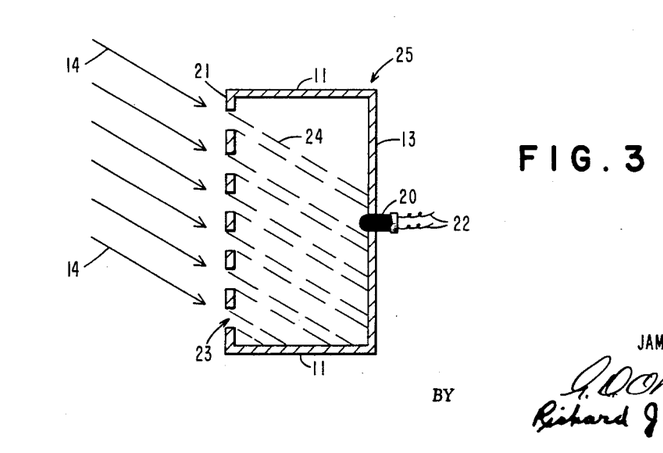
FIG. 3 diagrammatically shows a modified embodiment of the invention wherein a series of apertures are formed in the light mask to provide a sequence of on-off conditions of a binary indicator, such as a photo-diode, as the angle of incidence of the incoming light is changed.

In FIG. 3, the sensor 25 has a series of apertures 23 formed in lght mask 21 which will permit the passage of light therethrough from certain directions. As illustrated, light rays 14 passing through apertures 23 will produce light corridors 24, none of which impinge upon the photo-diode 20. The signal at 22, therefore, is a "0" indicating an "off" condition of the detecting device. It will be appreciated from considering the illustration, that as the sensor 25 is rotated to change the angle of incidence of the light vectors 14, the light corridors 24 will sweep over photo-diode 20, thereby providing a sequence of "on-off" conditions as the angle of incidence of the incoming light is changed.

Figure 4:
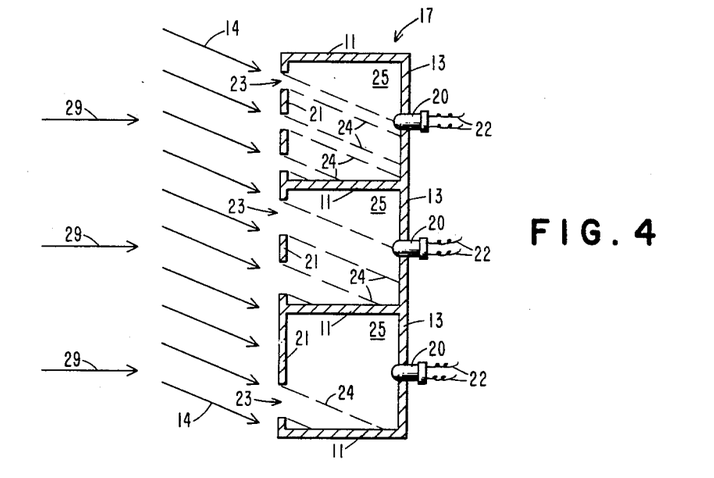
FIG. 4 illustrates another embodiment of the invention showing how several sensors can be fastened together so that they turn in unison to provide, by means of a proper selection of hole sizes and spacings in the different light mask, a sequence of binary numbers indicative of the combined sensor outputs.

A plurality of light sensors 25 can be connected together so that they turn in unison as shown in FIG. 4 to form a combined sensor 17. In this arrangement, by a proper selection of the size and spacings of apertures 23 in light masks 21, a sequence of binary numbers can be generated by the combined sensor outputs. As will be noted from the drawing, due to the increase in size of the apertures 23 moving from top to bottom, the size of light corridors 24 will correspondingly vary. At the time instant illustrated, the combined signals of the photo-diodes 20 moving from top to bottom are 1–1–0 indicating an on-on-off condition of the combined sensor 17. The walls 11, as will be appreciated from a perusal of the figure, prevent light passing from one sensor element 25 to the next.

As the combined sensor 17 is rotated (thus varying the angle of incidence of the light vectors 14), due to the physical location of the photo-diodes 20 with respect to the apertures 23 in the face mask 21, the binary output of "0" (i.e., "off") and "1" (i.e., "on") can be correlated to the direction angle of the light vector incident upon the combined sensor 17. For example, if light were coming from 0° inclination with respect to the light mask 21, as depicted by the vectors 29, only the top photo-diode 20 would be illuminated to produce an "on" condition and thus the binary digital indication of the composite sensor from top to bottom would be 1–0–0. It is, of course, preferable that the incident light rays be parallel to provide sharp edges to the light corridors. However, a limited amount of divergence or convergence can be tolerated.

As will be appreciated from a general knowledge of a binary numbering system, the angle, or viewing fan which the sensor embodiment shown in FIG. 4 can quantize is eight incremental sectors corresponding to three binary bits of information. However, due to a possible ambiguity, the combination 0–0–0 is not used. Therefore, only seven sectors are sensed by the above embodiment.

Figures 5A, 5B:
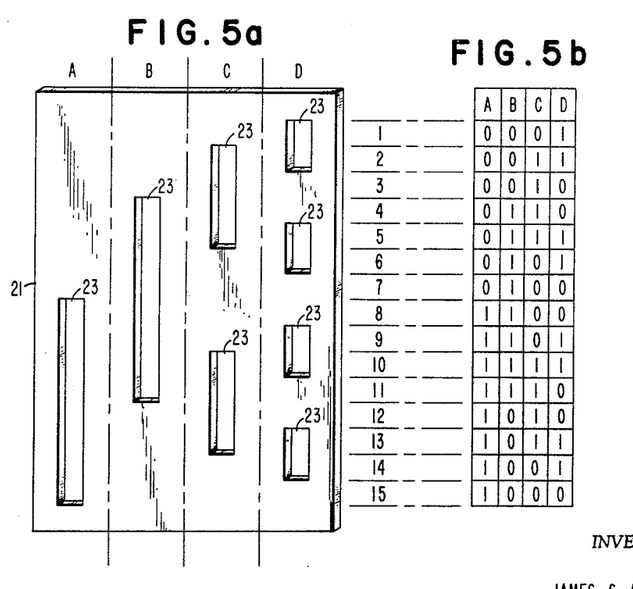
FIG. 5(a) illustrates a typical mask configuration that may be utilized with four sensor elements to quantize a viewing angle into fifteen segments.
FIG. 5(b) is a table showing the binary output signals corresponding to the mask of FIG. 5(a)

Referring now to FIG. 5(a), an example of a light mask configuration is illustrated that will divide a sensor with four diodes into fifteen equal sectors. Behind each section A, B, C and D of the light mask 21, a diode is positioned. The cutouts or apertures 23 are so spaced that fifteen sectors (designated 1 through 15 between FIGS. 5(a) and 5(b)) are defined. Considering FIGS. 5(a) and 5(b) together it will be understood that light from such a direction that it enters the sensor through only the upper portion of the highest cutout in section D (i.e., sector 1) will be indicated by the unique binary signal 0–0–0–1. Considering the other extreme, light coming from the lowest direction detectable (i.e., sector 15) can only enter the sensor through the bottom portion of the cutout 23 in section A and will be uniquely indicated by the sensor output 1–0–0–0. Obviously, all intermediate angles of light incidence will fall in one of the defined sectors of the mask, each sector of which is identifiable from its corresponding binary signal. This relationship is illustrated in the binary number output table shown in FIG. 5(b). As mentioned briefly heretofore, it will be understood that while a four digit binary number includes sixteen combinations, one of these, 0–0–0–0, is not used due to the ambiguity that the same signal is indicated irrespective of the light source position, so long as it is not "visible" to the sensor. It should be clear from the description that although the well known binary code known as the "Gray" code has been discussed in connection with the invention, any such combination could be used equally well.

Figure 7:
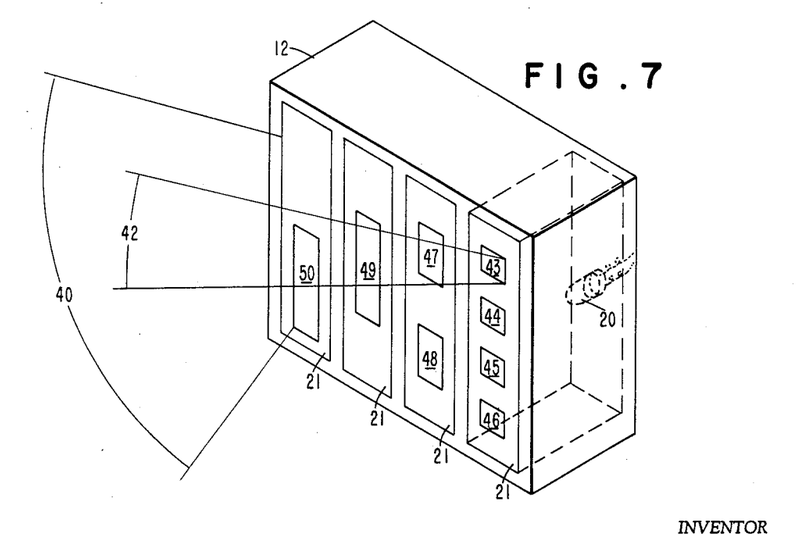
FIG. 7 shows another embodiment of the invention, by means of which, a viewing fan may be quantized into fifteen equal sectors corresponding to four binary bits of information.
Figure 8:
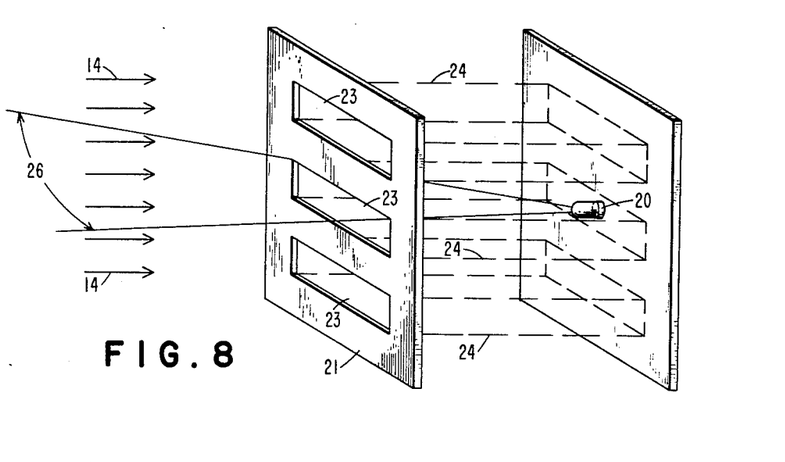
FIG. 8 diagrammatically illustrates a different embodiment which utilizes wide angle rectangular light mask apertures.

With respect to FIGS. 2, 3 and 4, the explanation has proceeded thus far from schematic elevational illustrations of the invention. Referring momentarily to FIGS. 7 and 8, it should be observed that the apertures which are cut or otherwise formed in light masks of the inventive sensor may be of any desired shape and are illustrated in FIG. 7, as relatively thin slits, of the type utilized in FIGS. 2, 3 and 4, while the embodiment of FIG. 8 incorporates rather wide angled rectangles. Considering for a moment what has been said so far in relation to the former modification, i.e., thin slits, it can be appreciated that the slits can be made of such length as to define, in composite arrangement, a segment of visibility or viewing fan from which light can be received and detected. In addition, by proper spacing of the individual slits, the composite viewing fan can be quantized into sectors of visibility. With specific reference to FIG. 7, four light masks 21, forming sensor 12, are arranged in parallel relationship and are provided with slits 43, 44, 45, 46, 47, 48, 49 and 50, to provide equal sector elements. That is to say, that the composite viewing fan or sector 40 is broken up into increments or sector elements by means of proper spacing and dimensioning of the apertures 43, 44, 45, 46, 47, 48, 49 and 50. As an illustration, the sector element 43 will "see" light approaching from within the depicted angle 42. Thus, light approaching from angle 42 will strike photo-diode 20 (visible in FIG. 7) to cause a "1" signal corresponding to "on." It will be understood of course that other diodes may be "on" or "off" in that same instant depending on the particular dimensioning established for the other light passing apertures. In the embodiment illustrated in FIG. 7 the viewing fan angle 40 may be quantized into fifteen sectors since the device illustrated has four photo-diode detectors corresponding to four binary bits.

It should be noted here, that although equal sector elements are generally considered preferable to establish equal accuracy limits of the light vector direction, this is not necessary to the practice of the invention. By adjustment of the dimensions and spacing of the light mask aperture code, the side of the elemental viewing sectors may be varied.

Figure 6:
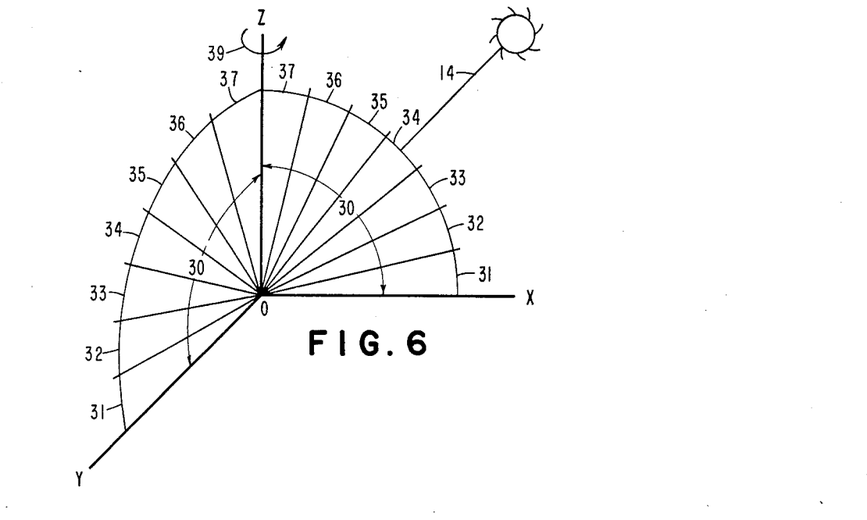
FIG. 6 is an illustration, on a cartesian coordinate system, of how the viewing fan of one embodiment of the invention is rotated into a plane necessary to permit the solar vector to illuminate one sector of the fan angle viewed by the sensor to produce a binary output indicative of the sun's position.

Referring now to FIG. 6, a simplified diagrammatic illustration is provided to illustrate how, when carried on a rotating satellite, an embodiment such as shown in FIG. 7 could detect the direction angle of the sun vector. The fan angle 30 is, for simplicity sake, shown as quantized into seven sector elements 31 through 37. The fan is shown as a planar surface, however, in practicality it may be a few degrees in width depending upon the actual physical construction of the sensing device. Assume that the viewing fan 30 is oriented in the plane Y–O–Z and assume further that the sun is in plane X–O–Z. At the time the fan is "looking" in the plane Y–O–Z, none of the sector elements 31 through 37 can "see" the sun and, therefore, all of their associated photo detecting devices will indicate "0" or "off." As a satellite carrying the sensor rotates, as shown by the direction of the arrow 39 in FIG. 6, the sensor and the fan angle of visibility will be rotated into the plane X–O–Z. At that time, light will be "seen" within the viewing fan 30 by the particular sector element 34 looking at the sun, and the binary number corresponding to the combination of diodes associated with that elemental sector will appear at the sensor output. In this manner, it can be ascertained from the binary digital output of the sensor that the sun vector direction angle is somewhere within the angles allotted to sector element 34.

It will be appreciated that although the viewing fan 30 has been shown with seven sector elements and the fan width has been neglected in FIG. 6, for simplicity sake, that the accuracy with which the direction angle of the solar vector can be located will be determined by the viewing or fan angle selected and the number of binary bits utilized. Alternate embodiments can employ any given field of view and can divide that field of view into $2^N-1$ parts where there are N binary bits. For example, the field of view can be divided into fifteen, thirty-one, sixty-three or more parts by using four, five, six or more, respectively, binary bits.

Figure 9:
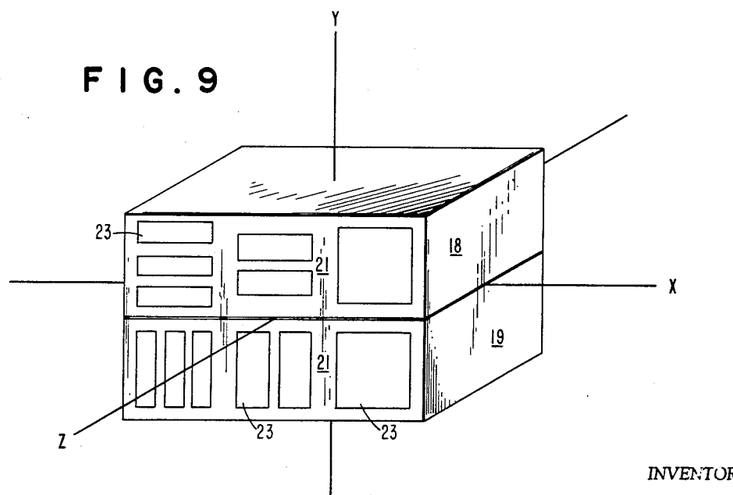
FIG. 9 illustrates an embodiment wherein the wide angled light masks such as those of FIG. 8 are oriented to produce a sensing device which will give a binary output corresponding to a direction cosine of the sun vector.

In FIG. 8, as previously indicated, the light masks 21 may be constructed in another embodiment, with wide angle apertures 23, which will obviously define light corridors 24 as the light rays 14 pass therethrough, which light corridors have a wide angle 26 perpendicular to the arc in which the measurement is to be made. As is apparent in the figure, the photo-diode 20 will register an "on" or "1" signal through an angle of light incidence that is wide in one direction. In order to uniquely define the sun vector direction with this embodiment then, two mutually perpendicular sensors may be employed. FIG. 9 illustrates one such arrangement. The upper sensor 18 has its light mask 21 apertured with wide angle openings 23 running in the direction of the horizontal, while the lower sensor 19 has its light mask 21 apertured in a similar manner in the vertical direction. As will be apparent from the figure the upper sensor can measure the sun's position in the plane of the Y–Z axes and the lower sensor will give an indication of the sun's position in the plane of the X–Z axes.

As is known, the direction of a line in space may be determined relative to any coordinate system by measuring the angles between that line and any two axes of the system. This determination follows from the relationship of the cosines of these direction angles (direction cosines), which when squared, will always total unity. Thus, given three such angles, A, B and C, $\cos^2 A + \cos^2 B + \cos^2 C = 1$. Therefore, an object's direction, relative to two axes of the coordinate system, may be determined by two binary digital indications, representative of the direction cosines of that object's vector. Such an arrangement as shown in FIG. 9, with a suitable number and spacing of apertures 23 and a sufficient number of photo-diodes, depending upon the accuracy which is required, can be utilized to determine the direction of a luminous object relative to a satellite, which satellite is not required to rotate with respect to the source of illumination.

Figure 10:
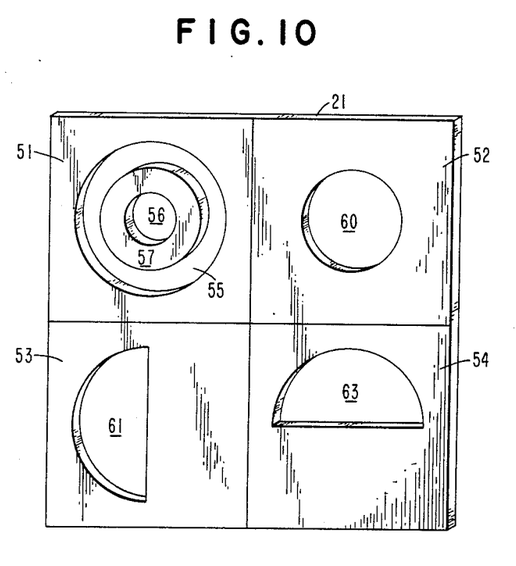
FIG. 10 schematically shows a modified embodiment of one light mask utilized with the instant invention, which will define the location of the light source in spherical coordinates.

FIG. 10 illustrates one form of light mask suitable for determining the position of the sun or other light source in spherical coordinates. Behind each of the four sections of the complete mask 21 there may be positioned a suitable photosensitive device, such as a photo-diode (not shown). Comparing FIGS. 10 and 11, then, it will be understood that binary digital output signals will be produced by the diodes in accordance with the sections illuminated by the sun. For example, considering the sections 51, 52, 53 and 54; should the diode corresponding to section 51 receive light so that it indicates a binary "1," it would be known that the sun is visible to the diode either through annular segment 55 or small circular aperture 56 depending on the state of the diode in section 52, the opening 60 of which corresponds to the inner diameter of annular segment 55. On the other hand, were the diode of section 51 "off" and the diode of section 52 "on," it would be known that the sun's position corresponds to the obstructed area between the annular segment 55 and circle 56 of section 51. By the same token, referring to the lower portion of FIG. 10, sun visible through semi-circular orifice 61 will cause the diode of section 53 to give an "on" indication; and, if the diode of section 54 were simultaneously registering "off," the sun's direction would be apparent, within measurment limits, from the binary indication of the sensor.

Figure 11:
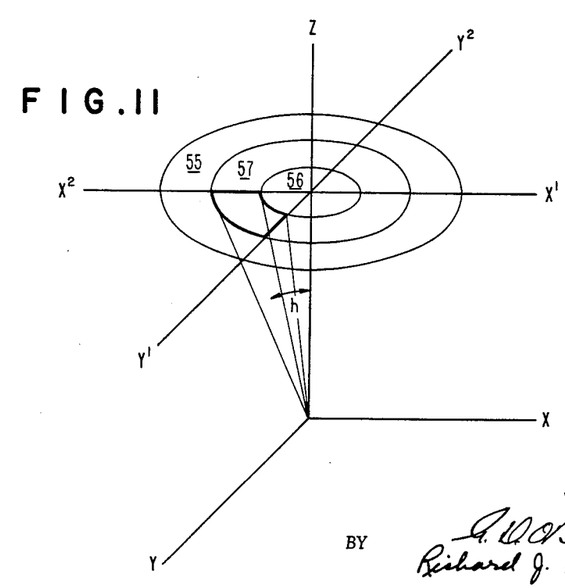
FIG. 11 is a simplified diagram illustrating how the light mask of FIG. 10 can be utilized to determine spherical coordinates of the light emitting source.

As will be understood from a study of FIG. 10 in connection with FIG. 11, the circular mask segments at the top of FIG. 10 will determine the angle, $h$, of the sun relative to the zenith. The semi-circular holes in the mask of the lower sections of FIG. 10 will determine the azimuth angle of the illuminating body in the X–Y plane. For purposes of illustration, let us asume that the sensor output reading of sections 51, 52, 53 and 54 in that order, were 0110. Relating that to FIG. 11 it will be seen that since the diode of section 51 is "off" and the diode of section 52 is "on," clearly the sun elevation angle must be somewhere in the angular ring labled 57 in FIG. 11. Further, since the diode of section 54 is "off" it is apparent that the sun is not to the rear of the axis $X^1$–$X^2$ in FIG. 11. Furthermore, since the diode corresponding to section 53 is "on," it is apparent that the sun must be in the half circle to the left of the $Y^1$–$Y^2$ axis in FIG. 11. Therefore, it can be concluded that the sun azimuth angle is between the lines $Y^1$ and $X^2$ in FIG. 11, and, its elevation is somewhere between the limits of that defined by the angular ring 57, that is, within the area outlined in heavy lines in FIG. 11. Obviously, by means of additional binary bits of information and closer spacing of the segmental elements defined by the apertures in the light mask, a much more exact set of coordinates can be made immediately available from the sensor output.

It has been discovered that the invention described by embodiments demonstrated hereinbefore can be further improved for some applications by fabrication of the sensor housing of glass having an index of refraction $n=1.517$. This feature of the invention becomes apparent after it is noted that by using a glass element having an index of refraction $n=1.517$, the angle of incidence of the incoming light is very nearly equal to the tangent of the angle of refraction of angles less than 70°. This feature is illustrated graphically in FIG. 12 where the angle of incidence is shown at 65 and the angle of refraction at 66. The value of this feature may be made more meaningful by considering FIG. 13, which is a sensor unit having a fan field of view extending from 60° below the horizon to 60° above, in conjunction with FIG. 14. Due to the mathematical relationship recited above it is possible, when using a glass block 75 having an index of refraction $n=1.517$, to essentially fold the sensor back on itself by using two photo-diodes; one placed at the bottom of the sensor looking at angles above the horizontal; and one placed at the top of the sensor looking at angles below the horizontal through the same holes 76 in the light mask 77. The practical result is that the sensor of FIG. 14 although much smaller (in fact, one half the size of the sensor of FIG. 13) performs the same function. Since as explained, the angle of incidence of incoming light is substantially equal to the tangent of the angle of refraction (for angle of less than 70 degrees), thus equal linear spacing of the holes 76 in the light mask 77 produces equal angular spacing of incident light producing the binary numbers. In space applications where size and weight are extremely important this improvement takes on added merit.

Figure 12:
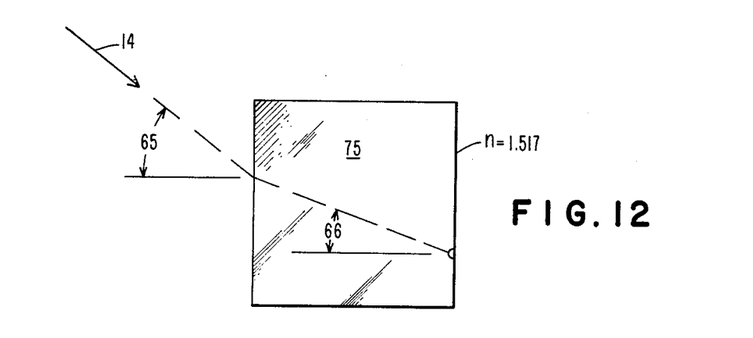
FIG. 12 schematically indicates the optical action produced by a glass block with an index of refraction of 1.517 and how this feature can be incorporated into an improved version of the invention.
Figures 13, 14:
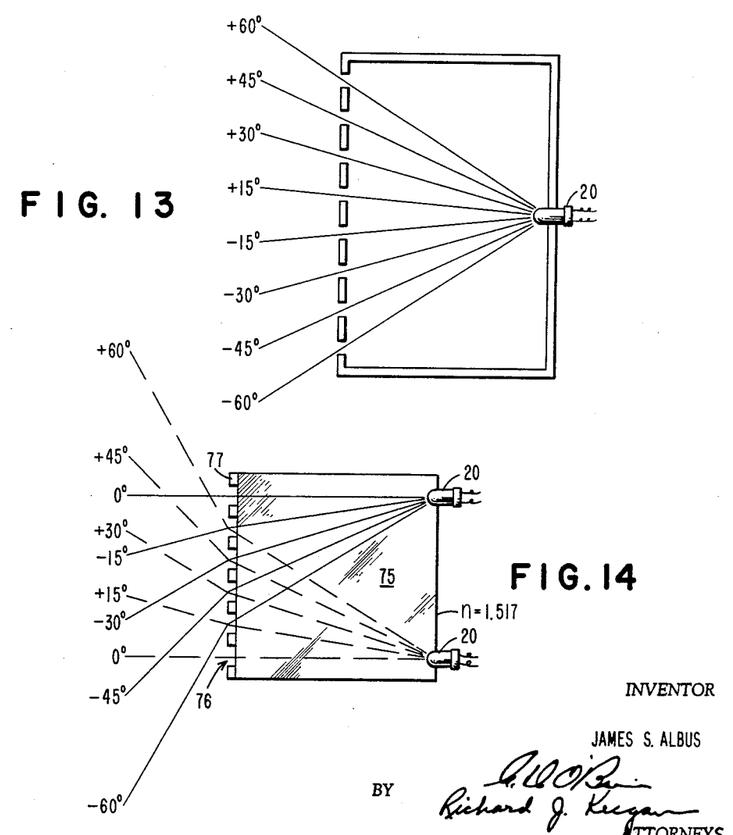
FIG. 13 is a simplified illustration of an embodiment of the invention which will indicate, by binary digital output the position of the sun or other light source between minus 60° and plus 60° above the horizontal.
FIG. 14 diagrammatically indicates an improved version of the embodiment of FIG. 13 using the feature of FIG. 12.
Figure 15:
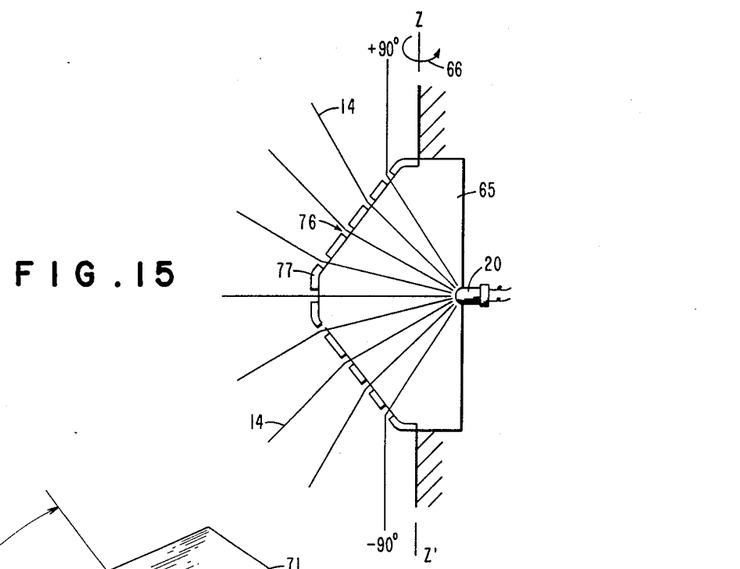
FIG. 15 illustrates schematically another embodiment of the instant invention which gives a wide angle effect for use with either a rotating or non-rotating carrier vehicle.

It should be apparent that the invention described thus far can be applied to transparent materials having other characteristics than the glass element 75 of FIGS. 12 and 14. For instance, a light mask can be deposited on various surfaces to produce focusing or extreme wide angle effects in accordance with the shape and refraction characteristics of the surface selected. One illustration of this principle is employed in the wide angle sensor illustrated in FIG. 15. A suitable glass block 65 having a surface shape compatible with the desired focusing effect has deposited on its outer surface, a light mask 77, having apertures 76 selected to give visibility through the desired angular positions. Light rays 14 incident upon the glass surface will be focused in to illuminate photo-diode 20. In the illustrated embodiment, the angles selected extend from minus 90° through plus 90° so that a rotation of the sensor around the axis Z–Z', as shown by the arrow 66, will provide a complete 360° viewing angle through which the sun may be "seen," when its rays correspond with the angles visible through the selected aperture arrangement of the light mask 77.

Figure 16:
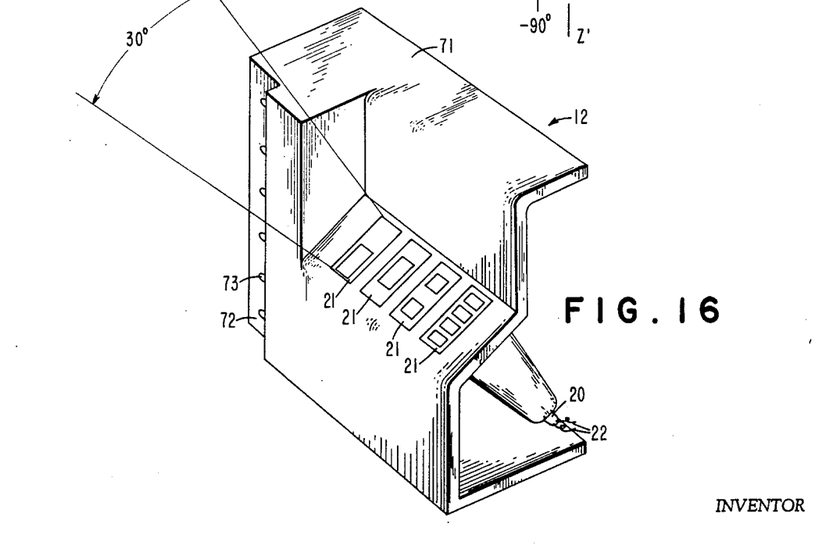
FIG. 16 illustrates one practical embodiment which is suitable for fixing the source of solar radiation within 2° of accuracy.

Referring now to FIG. 16, there is illustrated one practical application of an embodiment of the invention described. A sensor 12 having a housing 71 of aluminum, or other suitable material, is provided with a mounting flange 72 and bolt holes 73 for attachment to a space probe or space satellite. Carried in the housing 71 is a sensor embodiment having a capacity of four binary bits, comprising four diodes 20 (only one of which is shown) and four face masks 21 mounted in parallel aligned arrangement. The face masks contain suitable segmental apertures so that the combination will define equal sectors through which a solar or other light vector may pass. The particular fan angle selected for illustration here is 30° which, with four binary detector units, can give an equal sector accuracy of 2°. It will be obvious from what has been said previously that any suitable fan angle and any degree of accuracy can be selected as long as the field of view is divided into $2^N-1$ parts where there are N binary bits. The embodiment of FIG. 16 being shown as the fan angle type sensor, which uses slits to define its segmental sight elements, will, when a light source comes within its field of view, produce a unique binary digital output corresponding to the direction angle of the detected light ray.

Although only a few embodiments of the instant invention have been described in detail it will be understood that various changes in the details, materials, steps and arrangements of part, which have been herein described and illustrated in order to explain the nature of the invention, may be made by those skilled in the art within the principle and scope of the invention as expressed in the appended claims.

I claim:
1. A body including a sensing device for producing a direct digital output signals corresponding to a set of digits adapted to represent the direction of a light vector emanating from a light source, said light source and said body being relatively movable with respect to one another, comprising:
   light sensitive detection means on said body having a detector element corresopnding to each digit of said set, each of said detector elements having an ON state and an OFF state and being in one of said states when a predetermined amount of light impinges thereon and in the other of said states when said predetermined amount of light does not impinge thereon;
   a perforate light mask interposed between said light soure and said detection means;
   said mask having a different perforation pattern adjacent to each detector element, the perforation patterns being arranged relative to each other to form a unique perforate code, each perforation pattern being operative to permit said light vector to impinge on the adjacent detector element only when said light vector emanates from selected predetermined directions;
   whereby the group of output signals from said detector elements provides a coded digital representation of the direction of said light vector.

2. The device of claim 1 wherein said detector elements are comprised of photo electric diodes.

3. A light aspect sensing device for use on a rotating object to indicate the direction of a light emitting body relative to said object by producing a group of direct digital output signals corresponding to a set of digits adapted to represent the direction of a light vector emanating from said light emitting body, comprising:
   light sensitive detection means having a plurality of coplanar detector elements, one corresponding to each digit of said set and in a plane approximately parallel to the axis of rotation of said objects, each of said detector elements having an ON state and an OFF state and being in one of said states when a predetermined amount of light impinges thereon and in the other of said states when said predetermined amount of light does not impinge thereon;

a perforate light mask interposed between said light source and said detection means;

said mask having a particular perforation pattern adjacent to each detector element, the perforation patterns being arranged relative to each other to form a unique perforate code, each particular pattern being operative to permit said light vector to impinge on the adjacent detector element only when said light vector emanates from selected predetermined directions;

whereby the group of output signals from said detector elements provides a coded digital representation of the direction of said light emitting body.

4. The device of claim 3 wherein said detector elements are comprised of photo electric diodes.

5. A sensing device for producing a plurality of groups of direct digital output signals, each group corresponding to a set of digits adapted to represent the angular relationship, in a particular plane, of a light vector emanating from a light source, comprising:

light sensitive detection means adjacent to each of said groups, each said detection means having a plurality of coplanar detector elements, one corresponding to each digit of the corresponding set, each of said detector elements having an ON state and an OFF state and being in one of said states when a predetermined amount of light impinges thereon and in the other of said states when said predetermined amount of light does not impinge thereon;

a perforate light mask interposed between said light source and each of said detection means;

each of said masks having a particular perforation pattern adjacent to a corresponding detector element, the perforation patterns for each light mask being arranged relative to each other to form a unique perforate code, each particular pattern being operative to permit said light vector to impinge on the adjacent detector element only when said light vector emanates from selected predetermined directions;

whereby the group of output signals from the coplanar detector elements in each detection means provides a coded digital representation of the angular relationship of said light vector with respect to the plane of that detection means.

6. The device of claim 5 further defined in that the planes of at least two of said detection means are mutually perpendicular.

7. A sensing device for producing a plurality of groups of direct digital output signals, each group corresponding to a set of digits wherein the sets of digits represent direction cosines of a radiation vector emanating from a radiation source, comprising:

a radiation sensitive detection means adjacent to each of said groups, each said detection means having a plurality of coplanar detector elements, one corresponding to each digit of the corresponding set, the plane of each detection means being angularly displaced with respect to the plane of any other detection means, each of said detector elements having an ON state and an OFF state and being in one of said states when a predetermined amount of radiation impinges thereon and in the other of said states when said predetermined amount of radiation does not impinge thereon;

a perforate radiation mask interposed between said radiation source and each of said detection means;

each of said masks having a particular perforation pattern adjacent to a corresponding detector element, the perforation patterns for each radiation mask being arranged relative to each other to form a unique perforate code, each particular pattern being operative to permit said radiation vector to impinge on the adjacent detector element only when said radiation vector emanates from selected predetermined directions;

whereby each group of output signals provides a coded digital representation of the direction of said radiation vector with respect to the plane of the adjacent detection means and the plurality of groups of output signals represent the direction cosines of said radiation vector.

8. A sensing device for producing two groups of direct digital output signals, each group corresponding to a set of digits wherein the sets of digits represent direction angles of a light vector emanating from a light source, comprising:

a light sensitive detection means adjacent to each of said groups, each said detection means having a plurality of coplanar detector elements, one corresponding to each digit of the corresponding set, the planes of said detection means being displaced relative to each other by an angle of 90°, each of said detector elements having an ON state and an OFF state and being in one of said states when a predetermined amount of light impinges thereon and in the other of said states when said predetermined amount of light does not impinge thereon;

a perforate light mask interposed between said light source and each of said detection means;

each of said masks having a particular perforation pattern adjacent to a corresponding detector element, the perforation patterns for each light mask being arranged relative to each other to form a unique perforate code, each particular pattern being operative to permit said light vector to impinge on the adjacent detector element only when said light vector emanates from selected predetermined directions;

whereby each group of output signals provides a coded digital representation of the direction angle of said light vector with respect to the plane of the adjacent detection means and the two groups of output signals represent the direction angle of said light vector.

9. The device of claim 8 wherein said detection means is comprised of photo electric diodes.

10. A sensing device for producing a group of direct digital output signals corresponding to a set of digits adapted to represent the spherical coordinates of a light vector emanating from a light source comprising:

light sensitive detection means having a detector element corresponding to each digit of said set, each of said detector elements having an ON state and an OFF state and being in one of said states when a predetermined amount of light impinges thereon and in the other of said states when said predetermined amount of light does not impinge thereon;

a perforate light mask interposed between said light source and each of said detection means;

said mask having a particular annular and semicircular perforation pattern adjacent to each detector element, the annular and semicircular perforation patterns being arranged relative to each other to form a unique perforate code, each particular pattern being operative to permit said light vector to impinge on the adjacent detector element only when said light vector emanates from selected predetermined directions;

whereby the group of output signals from said detector elements provides a coded digital representation of the spherical coordinates of said light vector.

11. A light aspect sensing device for use on a rotating object to indicate the direction of a light vector relative to said object by producing a series of output signals, comprising:

a light transparent body of refractive material, said body having inclined faces on one side thereof;

a light sensitive detection element located opposite said inclined faces of said transparent body, said detection element having an ON state and an OFF state and being in one of said states when a predetermined amount of light impinges thereon and in the other of said states when said predetermined amount of light does not impinge thereon;

means to rotate said object through an arc comprised of a sensing arc during which said predetermined light impinges on said detection element and a non-sensing arc during which said predetermined light does not impinge on said detection element;

a perforate light mask disposed on the inclined faces of said transparent body and between a light source creating said light vector and said detection means when said object is rotating through said sensing arc, the perforations in said mask being arranged relative to each other to form a unique perforate code and operative to permit said light vector to impinge on said detection means only when said object rotates through selected predetermined portions of said sensing arc, said detector element thereby turning on and off in a predetermined manner as said object rotates through said sensing arc;

whereby the series of output signals from said detector element provides a coded digital representation of the direction of said light vector relative to said object as said object rotates through said sensing arc.

References Cited by the Examiner

UNITED STATES PATENTS

| | | | |
|---|---|---|---|
| 2,747,797 | 5/56 | Beaumont | 250—208 |
| 2,807,752 | 9/57 | McIlvaine | 250—214 X |
| 2,850,673 | 9/58 | Beckman et al. | 250—214 X |
| 2,855,523 | 10/58 | Berger | 250—214 |
| 2,892,094 | 6/59 | Lehovec | 250—214 X |
| 2,999,161 | 9/61 | Lovoff | 250—83.3 |
| 2,999,939 | 9/61 | Bible et al. | 250—203 |
| 3,031,351 | 4/62 | McIlvaine | 250—237 |
| 3,109,923 | 11/63 | Welsh | 250—219 |
| 3,131,249 | 4/64 | Kunze | 250—203 X |
| 3,137,794 | 6/64 | Seward | 250—203 X |

OTHER REFERENCES

Sun sensor Orients Space Craft: Electronics, March 4, 1960, pp. 62, 64.

RALPH G. NILSON, *Primary Examiner.*

WALTER STOLWEIN, *Examiner.*